United States Patent
Kim et al.

(10) Patent No.: US 11,763,153 B2
(45) Date of Patent: *Sep. 19, 2023

(54) METHOD AND APPARATUS WITH NEURAL NETWORK OPERATION

(71) Applicants: Samsung Electronics Co., Ltd., Suwon-si (KR); Seoul National University R&DB Foundation, Seoul (KR)

(72) Inventors: Yoojin Kim, Suwon-si (KR); Soonhoi Ha, Seoul (KR); Donghyun Kang, Seoul (KR); Jintaek Kang, Seoul (KR)

(73) Assignees: Samsung Electronics Co., Ltd., Suwon-si (KR); Seoul National University R&DB Foundation, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/964,446

(22) Filed: Oct. 12, 2022

(65) Prior Publication Data

US 2023/0031471 A1    Feb. 2, 2023

Related U.S. Application Data

(63) Continuation of application No. 16/857,588, filed on Apr. 24, 2020, now Pat. No. 11,501,166.

(30) Foreign Application Priority Data

Oct. 16, 2019    (KR) .................. 10-2019-0128715

(51) Int. Cl.
    *G06N 3/08*    (2023.01)
    *G06N 3/04*    (2023.01)
(52) U.S. Cl.
    CPC .............. *G06N 3/08* (2013.01); *G06N 3/04* (2013.01)

(58) Field of Classification Search
USPC .................... 706/1, 6, 25, 26, 33, 37, 41
See application file for complete search history.

(56) References Cited

U.S. PATENT DOCUMENTS

| | | | |
|---|---|---|---|
| 9,818,059 B1 * | 11/2017 | Woo | G06F 9/3824 |
| 10,552,370 B2 * | 2/2020 | Henry | G06F 9/3836 |

(Continued)

FOREIGN PATENT DOCUMENTS

| | | |
|---|---|---|
| EP | 3 035 250 A2 | 6/2016 |
| KR | 10-2016-0142791 A | 12/2016 |

(Continued)

OTHER PUBLICATIONS

Mueller, Rene, et al. "Sorting networks on FPGAs." The VLDB Journal 21.1 (2012): 1-23 (23 pages in English).

(Continued)

*Primary Examiner* — Brian Ngo
(74) *Attorney, Agent, or Firm* — NSIP Law

(57) ABSTRACT

A processor-implemented neural network method includes: generating a bit vector based on whether each of a plurality of input activations within a neural network is 0; merging the bit vector into the input activations such that bit values within the neural network included in the bit vector are most significant bits (MSBs) of multi bit expressions of the input activations; merging the bit vector into weights such that the bit values included in the bit vector are MSBs of multi bit expressions of the weights; sorting the input activations and the weights based on bits corresponding to the MSBs; and implementing the neural network, including performing operations between the sorted input activations and the sorted weights.

19 Claims, 13 Drawing Sheets

(56) References Cited

U.S. PATENT DOCUMENTS

| | | | |
|---|---|---|---|
| 11,132,990 | B1* | 9/2021 | Sun .................. G10L 25/21 |
| 2014/0344513 | A1 | 11/2014 | Lo et al. |
| 2017/0011288 | A1 | 1/2017 | Brothers et al. |
| 2017/0293659 | A1 | 10/2017 | Huang |
| 2018/0046898 | A1 | 2/2018 | Lo |
| 2018/0189640 | A1* | 7/2018 | Henry ................ G06N 3/063 |
| 2018/0253636 | A1 | 9/2018 | Lee et al. |
| 2021/0012178 | A1* | 1/2021 | Venkatesh ............ G06N 3/08 |
| 2021/0019616 | A1* | 1/2021 | Chen ................ G06N 3/045 |
| 2021/0064954 | A1* | 3/2021 | Choi ................ G06N 3/063 |

FOREIGN PATENT DOCUMENTS

| | | |
|---|---|---|
| KR | 10-2018-0101978 A | 9/2018 |
| KR | 10-2019-0129240 A | 11/2019 |
| WO | WO 2019/216513 A1 | 11/2019 |

OTHER PUBLICATIONS

Prasad, Devi, et al. "Sorting networks on FPGA." *Proceedings of the WSEAS International Conference on Telecommunications and Informatics (TELE-INFO)*. 2011 (3 pages in English).

Zhang, Shijin, et al. "Cambricon-x: An accelerator for sparse neural networks." *2016 49th Annual IEEE/ACM International Symposium on Microarchitecture (MICRO)*. IEEE, 2016 (12 pages in English).

Albericio, Jorge, et al. "Cnvlutin: Ineffectual-neuron-free deep neural network computing." *ACM SIGARCH Computer Architecture News* 44.3 (2016): 1-13 (13 pages in English).

Kim, Dongyoung, et al. "A novel zero weight/activation-aware hardware architecture of convolutional neural network." *Design, Automation & Test in Europe Conference & Exhibition (DATE)*, 2017. IEEE, 2017 (6 pages in English).

Park, Eunhyeok, et al. "Energy-efficient neural network accelerator based on outlier-aware low-precision computation." *2018 ACM/IEEE 45th Annual International Symposium on Computer Architecture (ISCA)*. IEEE, 2018 (11 pages in English).

Chen, Tianshi, et al. "Diannao: A small-footprint high-throughput accelerator for ubiquitous machine-learning."*ACM SIGARCH Computer Architecture News* 42.1 (2014): 269-284 (15 pages in English).

EESR issued on Jan. 12, 2021 in counterpart of European Patent Application No. 20181643.6 (12 pages in English).

\* cited by examiner

METHOD AND APPARATUS WITH NEURAL NETWORK OPERATION

CROSS-REFERENCE TO RELATED APPLICATION

This application is a continuation of U.S. patent application Ser. No. 16/857,588 filed on Apr. 24, 2020 which claims the benefit of Korean Patent Application No. 10-2019-0128715, filed on Oct. 16, 2019, in the Korean Intellectual Property Office, the entire disclosures of which are incorporated herein by reference for all purposes.

BACKGROUND

1. Field

The present disclosure relates to methods and apparatuses with neural network operations.

2. Description of Related Art

A neural network may be a computing system implemented with reference to a computational architecture.

A typical neural network device may require a large amount of operations for complex input data. Moreover, the typical neural network device may not efficiently process operations and therefore the typical neural network device may not efficiently analyze input data in real time and extract information. Accordingly, as the typical neural network device may require a large amount of operations and/or inefficiently process the operations, the performance of the typical neural network device may be inefficient when implemented by low-power, high-performance embedded systems such as smartphones having limited resources.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented neural network method includes: generating a bit vector based on whether each of a plurality of input activations within a neural network is 0; merging the bit vector into the input activations such that bit values within the neural network included in the bit vector are most significant bits (MSBs) of multi bit expressions of the input activations; merging the bit vector into weights such that the bit values included in the bit vector are MSBs of multi bit expressions of the weights; sorting the input activations and the weights based on bits corresponding to the MSBs; and implementing the neural network, including performing operations between the sorted input activations and the sorted weights.

The generating of the bit vector may include: generating a first bit value of the bit values in response to an input activation among the input activations not being 0; and generating a second bit value of the bit values in response to another input activation among the input activations being 0.

The first bit value may be 1 and the second bit value may be 0.

The merging of the bit vector into the input activations may include merging the first bit value into an MSB of the input activation and merging the second bit value into an MSB of the other input activation.

The sorting may include: sorting the input activations in an order of a first group including input activations in which the first bit value is merged into the MSB and a second group including input activations in which the second bit value is merged into the MSB; and sorting the weights in an order of a third group including weights in which the first bit value is merged into the MSB and a fourth group including weights in which the second bit value is merged into the MSB.

In response to a total number of input activations belonging to the second group being less than a preset value, the performing of the operations may include respectively performing operations between an nth input activation among the sorted input activations and an nth input weight among the sorted weights, wherein n is a natural number.

In response to a total number of input activations in the second group being less than a preset value, the performing of the operations may include performing operations between each input activation among the sorted input activations and corresponding input weight among the sorted weights.

In response to a total number of input activations belonging to the second group being greater than or equal to a preset value, the performing of the operations may include: performing operations between the input activations belonging to the first group and the weights belonging to the third group; and skipping one or more operations between the input activations belonging to the second group and the weights belonging to the fourth group.

The preset value may be a total number of input activations on which operations are configured to be performed simultaneously by a processor, and the skipping of the one or more operations may include skipping operations between a number of input activations corresponding to the preset value from among the input activations belonging to the second group and a number of weights corresponding to the preset value from among the weights belonging to the fourth group.

The generating of the bit vector may include: generating a first vector by: generating a first bit value of the first vector in response to an input activation among the input activations not being 0, and generating a second bit value of the first vector in response to another input activation among the input activations being 0; generating a second vector by: generating a first bit value of the second vector in response to a weight among the weights not being 0, and generating a second bit value of the second vector in response to another weight among the weights being 0; and generating the bit vector by performing an AND logic operation between the first vector and the second vector.

The merging of the bit vector into the weights may include merging a bit value, which is merged into an MSB of a multi bit expression of an input activation among the input activations, into an MSB of a multi bit expression of a weight among the weights on which an operation is to be performed with the input activation.

The sorting may be performed according to any one of a bubble sort algorithm, a shell sort algorithm, a bitonic sort algorithm, a comb sort algorithm, a cycle sort algorithm, and an even-odd mergesort algorithm.

The input activations are output activations of a previous layer of the neural network, and the performing of the operations between the sorted input activations and the sorted weights may include generating output activations of a current layer of the neural network.

A non-transitory computer-readable storage medium may store instructions that, when executed by one or more processors, configure the processor to perform the method.

In another general aspect, a neural network apparatus may include: a processor configured to: generate a bit vector based on whether each of a plurality of input activations within a neural network is 0; merge the bit vector into the input activations such that bit values within the neural network included in the bit vector are most significant bits (MSBs) of multi bit expressions of the input activations; merge the bit vector into weights such that bit values included in the bit vector are MSBs of multi bit expressions of the weights; sort the input activations and the weights based on bits corresponding to the MSBs; and implement the neural network, including performing operations between the sorted input activations and the sorted weights.

For the generating of the bit vector, the processor may be configured to: generate a first bit value of the bit values in response to an input activation among the input activations not being 0; and generate a second bit value of the bit values in response to another input activation among the input activations being 0.

For the sorting, the processor may be configured to: sort the input activations in an order of a first group including input activations in which the first bit value is merged into the MSB and a second group including input activations in which the second bit value is merged into the MSB; and sort the weights in an order of a third group including weights in which the first bit value is merged into the MSB and a fourth group including weights in which the second bit value is merged into the MSB.

In response to a total number of input activations belonging to the second group being less than a preset value, the processor may be configured to perform operations between an $n^{th}$ input activation among the sorted input activations and an $n^{th}$ input weight among the sorted weights, wherein n is a natural number.

For the performing of the operations, in response to a total number of input activations belonging to the second group being greater than or equal to a preset value, the processor may be configured to: perform operations between the input activations belonging to the first group and the weights belonging to the third group; and skip one or more operations between the input activations belonging to the second group and the weights belonging to the fourth group.

The preset value may be a total number of input activations on which operations are configure to be performed simultaneously by the processor, and for the skipping of the one or more operations, the processor may be configured to skip operations between a number of input activations corresponding to the preset value from among the input activations belonging to the second group and a number of weights corresponding to the preset value from among the weights belonging to the fourth group.

For the generating of the bit vector, the processor may be configured to: generate a first vector by: generating a first bit value of the first vector in response to an input activation among the input activations not being 0, and generating a second bit value of the first vector in response to another input activation among the input activations being 0, generate a second vector by: generating a first bit value of the second vector in response to a weight among the weights not being 0, and generating a second bit value of the second vector in response to another weight among the weights being 0, and generate the bit vector by performing an AND logic operation between the first vector and the second vector.

For the merging of the bit vector into the weights, the processor may be configured to merge a bit value, which is merged into an MSB of a multi bit expression of an input activation among the input activations, into an MSB of a multi bit expression of a weight among the weights on which an operation is to be performed with the input activation.

For the sorting, the processor may be configured to sort the input activations and the weights according to any one of a bubble sort algorithm, a shell sort algorithm, a bitonic sort algorithm, a comb sort algorithm, a cycle sort algorithm, and an even-odd mergesort algorithm.

The apparatus may include a memory storing instructions that, when executed by the processor, configure the processor to perform the generating of the bit vector, the merging of the bit vector into the input activations, the merging of the bit vector into the weights, the sorting of the input activations and the weights, and the performing of the operations between the sorted input activations and the sorted weights.

In another general aspect, a processor-implemented method of performing neural network operations includes: obtaining input activations and corresponding weights from a memory; sorting the input activations in an order of input activations having nonzero values and input activations having zero values; sorting the weights in an order of weights having nonzero values and weights having zero values; and performing operations between the sorted input activations and the sorted weights by skipping one or more operations between input activations having zero values and the weights having zero values.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
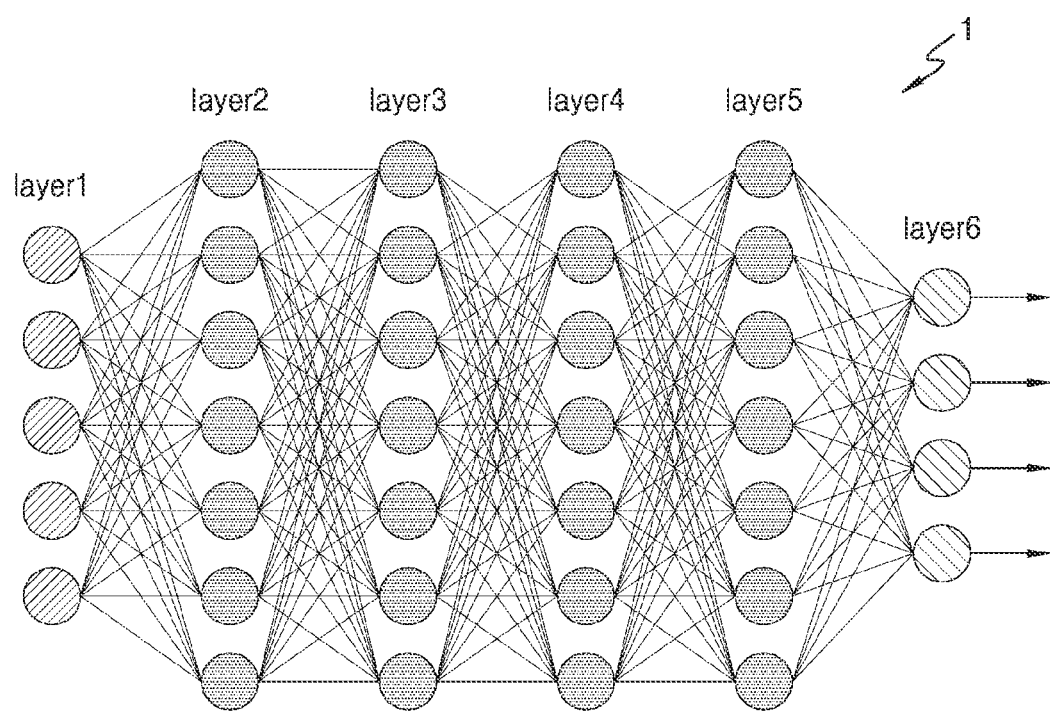
FIG. 1 illustrates a neural network architecture according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Reference will now be made in detail to embodiments, examples of which are illustrated in the accompanying drawings, wherein like reference numerals refer to like elements throughout. In this regard, the one or more embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Throughout the specification, when an element is referred to as being "connected to" another element, it may be directly connected to the other element or electrically connected to the other element with an intervening element disposed therebetween. Also, the term "including" an element does not preclude the other elements but further includes an element unless otherwise stated.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Hereinafter, embodiments of the present disclosure will be described in detail with reference to the accompanying drawings. However, example embodiments of the present disclosure may be embodied in many alternate forms and should not be construed as limited to example embodiments of the present disclosure set forth herein.

FIG. 1 illustrates a neural network architecture according to one or more embodiments.

A neural network 1 illustrated in FIG. 1 may be a deep neural network (hereinafter, referred to as "DNN") architecture. The DNN may be a convolutional neural network (CNN), a recurrent neural network (RNN), a deep belief network, a restricted Boltzmann machine, but is not limited thereto. The neural network 1 may be a DNN including an input layer (Layer 1), four hidden layers (Layer 2, Layer 3, Layer 4, and Layer 5), and an output layer (Layer 6). For example, when the neural network 1 is a convolutional neural network (CNN), the layers (Layer 1 to Layer 6) may correspond to some layers of the CNN, such as a convolutional layer, a pooling layer, and a fully connected layer.

Each of the layers included in the neural network 1 may include a plurality of artificial nodes also known as "neurons", "processing elements (PEs)", or similar terms thereto. While the nodes may be referred to as "artificial nodes" or "neurons," such reference is not intended to impart any relatedness with respect to how the neural network architecture computationally maps or thereby intuitively recognizes information and how a human's neurons operate. I.e., the terms "artificial nodes" or "neurons" are merely terms of art referring to the hardware implemented nodes of a neural network. As shown in FIG. 1, the input layer (Layer 1) may include five nodes and the hidden layer (Layer 2) may include seven nodes, for example. However, this is only an example, and each of the layers included in the neural network 1 may include various numbers of nodes.

The nodes included in each of the layers included in the neural network 1 may be connected to one another to exchange data. For example, one node may receive data from other nodes and perform operations thereon and output operation results to other nodes.

The neural network 1 implemented by a DNN architecture may include a plurality of layers that process effective information. Thus, the neural network 1 may process more complex data sets than neural networks including a single layer. Although FIG. 1 illustrates that the neural network 1 includes six layers, this is only an example and the neural network 1 may include less or more layers. That is, the neural network 1 may include various structures of layers different from that illustrated in FIG. 1.

Figure 2:
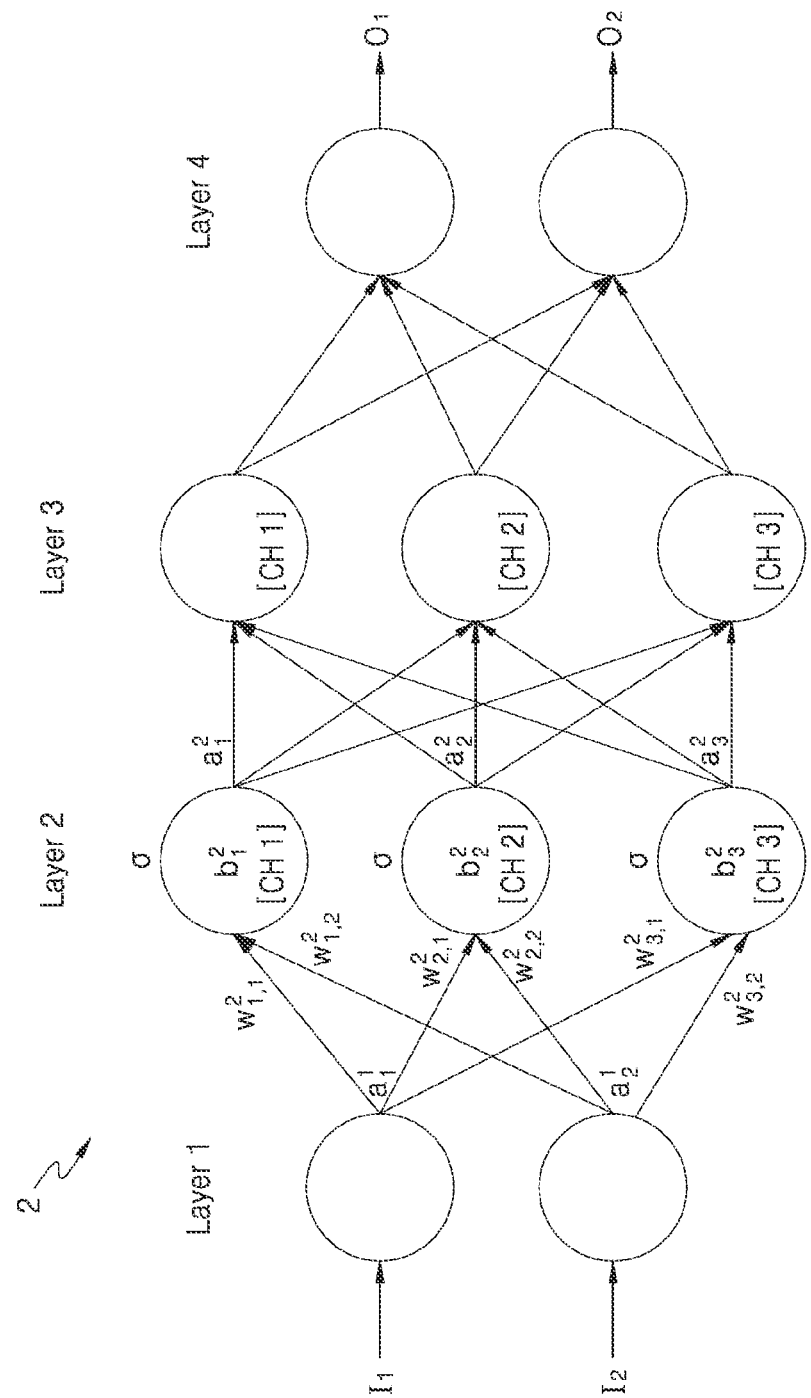
FIG. 2 illustrates an operation performed by a neural network according to one or more embodiments.

FIG. 2 illustrates an operation performed by a neural network according to one or more embodiments.

Thus, as illustrated in FIG. 2, a neural network 2 may have a structure including an input layer, hidden layers, and an output layer, may perform operations based on received input data (e.g., $I_1$ and $I_2$), and may generate output data (e.g., $O_1$ and $O_2$) based on a result of the operations.

The neural network 2 may be a DNN or an n-layer neural network including two or more hidden layers as described above. For example, as illustrated in FIG. 2, the neural network 2 may be a DNN including an input layer (Layer 1), two hidden layers (Layer 2 and Layer 3), and an output layer (Layer 4). Because the neural network 2 implemented by a DNN architecture includes more layers capable of processing effective information, the neural network 2 may process more complex data sets than neural networks having a single layer. The neural network 2 may include less or more layers or less or more channels. That is, the neural network 2 may include various structures of layers different from that illustrated in FIG. 2.

The neural network 10 may be configured to perform, as non-limiting examples, object classification, object recognition, voice recognition, and image recognition by mutually mapping input data and output data in a nonlinear relationship based on deep learning. Such deep learning is indicative of processor implemented machine learning schemes for solving issues, such as issues related to automated image or speech recognition from a big data set, as non-limiting examples. The deep learning may be implemented by mapping of input data and the output data through supervised or unsupervised learning or training, such that when trained the resultant machine learning model, engine, or example NN may intuitively map further input data to output data with a desired accuracy or reliability. Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

Each of the layers included in the neural network 2 may include a plurality of channels. The channels may correspond to a plurality of artificial nodes also known as neurons, PEs, units, or similar terms thereto. For example, as illustrated in FIG. 2, the input layer (Layer 1) may include two channels (nodes) and each of the hidden layers (Layer 2 and Layer 3) may include three channels. However, this is only an example, and each of the layers included in the neural network 2 may include various numbers of channels (nodes).

The channels included in each of the layers included in the neural network 2 may be connected to one another to process data. For example, one channel may receive data from other channels and perform operation thereon and output operation results to other channels.

An output value of a channel may be referred to as an activation, or a value which results from such a predetermined activation function of the corresponding channel. Input and output of each channel may be referred to as input activation and output activation, respectively. That is, an activation may be a parameter corresponding to an output of one channel as well as input of another channel included in a next layer, due to corresponding connection(s) with the next layer. Each channel may determine its own activation based on resultant activations received from channels included in a previous layer and a weight and a bias. A weight may be a parameter used to calculate an output activation in each channel, and may be a value assigned to a connection relationship between the channels. For example, an output from a previous layer's channel may be provided to as an input to a channel of a next or subsequent layer through a weighted connection between the previous layer's channel and the channel of the next layer, with the weight of the weighted connection being variously adjusted during the training of the neural network until the neural network is trained for a desired objective. There may be additional connections to the channel of the next layer, such as for providing a bias connection value through a connection that may or may not be weighted and/or for providing the above example recurrent connection which may be weighted. During training and implementation such connections and connection weights may be selectively implemented, removed, and varied to generate or obtain a resultant neural network that is thereby trained and that may be correspondingly implemented for the trained objective, such as for any of the above example recognition objectives.

Accordingly, returning to FIG. 1, each channel may be processed by a computational unit or processing element that receives an input (e.g., through such weighted connections) and outputs an output activation and inputs-outputs of each channel may be mapped. The computational unit may correspond to the activation function for a channel. As a non-limiting example, when σ is an activation function, $w_{jk}^i$ is a weight from a $k^{th}$ channel included in an $(i-1)^{th}$ layer to a $j^{th}$ channel included in an $i^{th}$ layer, $b_j^i$ is a bias of the $j^{th}$ channel included in the $i^{th}$ layer, and $a_j^i$ is an activation of the $j^{th}$ channel of the $i^{th}$ layer, the activation $a_j^i$ may be calculated using Equation 1 below.

$$a_j^i = \sigma\left(\sum_k (w_{jk}^j \times a_k^{i-1}) + b_j^i\right) \quad \text{Equation 1}$$

As illustrated in FIG. 2, the activation of a first channel CH 1 of a second layer (Layer 2) may be expressed by $a_1^2$. In addition, according to Equation 1, the $a_1^2$ may have a value of $a_1^2=\sigma(w_{1,1}^2 \times a_1^1 + w_{1,2}^2 \times a_2^1 + b_1^2)$. However, the above-described Equation 1 is only an example for describing the activation, the weight, and the bias used to process data in the neural network 2, and the embodiment is not limited thereto. The activation may be a value obtained by processing a weighted sum of activations received from the previous layer by using an activation function such as a sigmoid function or a Rectified Linear Unit (ReLU) function.

In a typical neural network implementing the structure of the neural network 2 as described above, numerous data sets may be exchanged between a plurality of channels interconnected to one another, and may undergo numerous operation processes while passing through layers. Thus, a neural network of one or more embodiments may reduce a loss of precision while advantageously decreasing an amount of operations used to process complex input data, thereby increasing a processing speed and/or reducing a used processing power of processor-implemented devices on which the neural network of one or more embodiments may be implemented.

Figure 3:
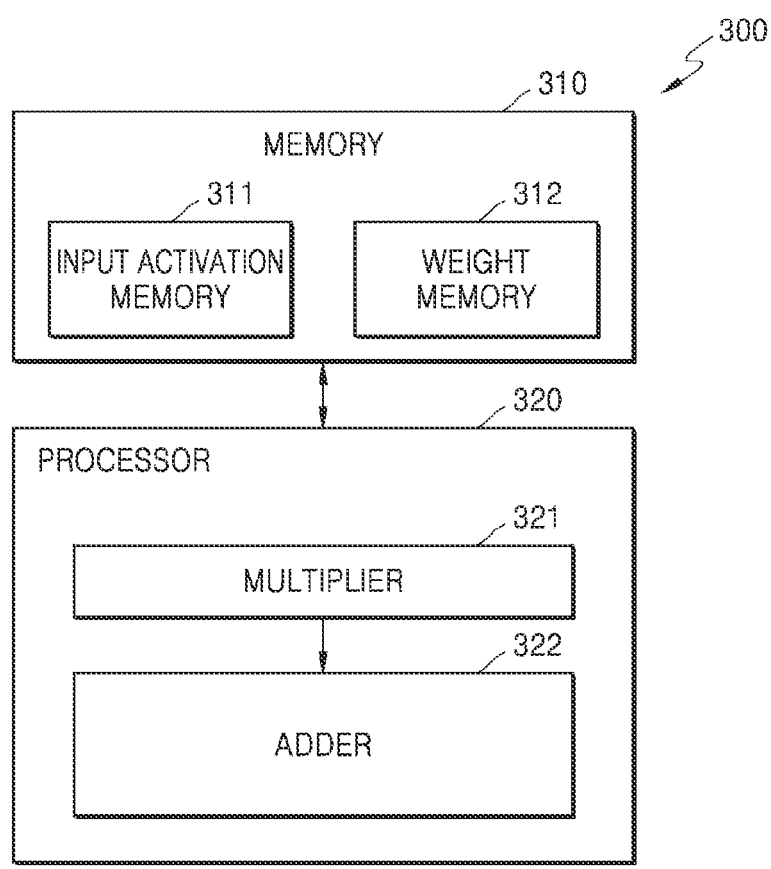
FIG. 3 illustrates a configuration of a neural network device according to one or more embodiments.

FIG. 3 illustrates a neural network device according to one or more embodiments.

A neural network device 300 may be a device in which a neural network (e.g., the neural network 1 of FIG. 1 or the neural network 2 of FIG. 2) implemented as, or using, various types of devices such as personal computers (PCs), server devices, mobile devices, and embedded devices. For example, the neural network device 300 may be implemented as, or using, various devices that perform speech recognition, image recognition, image classification, and the like using any one or any combination of the neural network layers and/or neural networks made up of one or more of the layers of nodal convolutional interactions discussed herein, such as smart phones, tablet devices, augmented reality (AR) devices, Internet of Things (IoT) devices, autonomous driving vehicles, robot devices, and medical devices, without being limited thereto. Furthermore, the neural network device 300 may be a hardware (HW) accelerator dedicated for implementing or driving the above-described devices or a hardware accelerator dedicated for implementing or driving a neural network, such as a neural processing unit (NPU), a tensor processing unit (TPU), and a neural engine, without being limited thereto.

Referring to FIG. 3, the neural network device 300 may include a memory 310 and a processor 320. It will be understood to one of ordinary skill in the art after an understanding of the present disclosure that the neural network device 300 may further include general-use components in addition to the components illustrated in FIG. 3.

The memory 310 may store data processed and to be processed by the neural network device 300. For example, the memory 310 may store input activation data, weight data, and the like which are processed in layers of the neural network. The memory 310 may be random access memory (RAM) such as dynamic random access memory (DRAM) and static random access memory (SRAM), read-only memory (ROM), electrically erasable programmable read-only memory (EEPROM), CD-ROM, blue-ray disk, or other optical disk storage, hard disk drive (HDD), solid state drive (SSD), or flash memory, without being limited thereto.

Referring to FIG. 3, the memory 310 may include an input activation memory 311 and a weight memory 312. The input activation memory 311 and the weight memory 312 may store input activation data and weight data, respectively. The activation memory 311 may be physically separated from the weight memory 312, but the embodiment is not limited thereto. For example, FIG. 3 exemplarily shows that one memory 310 stores input activation data and weight data, but the activation memory 311 and the weight memory 312 may share one physically connected memory 310.

The processor 320 may read/write data processed in the neural network device 300, e.g., input activation data or weight data, from the memory 310 and execute the neural network device 300 by using the read/written data. For example, the processor 320 may perform operations between input activation data and weight data.

In addition, the processor 320 may include a multiplier 321 and an adder 322.

The multiplier 321 may include an array of a plurality of multipliers. For example, the multiplier 321 may include k multipliers. Multiplication operations between input activations and weights may be carried out respectively in the k multipliers in parallel. For example, in the multiplier 321, point multiplication operations between k input activations and k weights respectively corresponding to the input activations may be performed. Thus, k may be a basic unit of operations performed by the processor 320.

The adder 322 may receive results of multiplication operations between the k input activations and the k weights respectively corresponding to the input activations from the multiplier 321. The adder 322 may sum up all results of k multiplication operations to output a result.

The processor 320 may be a central processing unit (CPU), a graphics processing unit (GPU), an application processor (AP), or the like included in the neural network device 300, but is not limited thereto.

When a value of at least one of the input activation and the weight is 0, a result of the multiplication operation therebetween is 0 which therefore may not affect the result. Therefore, when the value of at least one of the input activation and the weight is 0, the operation between the input activation and the weight may be skipped (e.g., determined not to be performed and/or not performed).

As described above, the processor 320 may perform operations between the k input activations and the k weights respectively corresponding to the input activations, as a basic unit. Thus, when the processor 320 is able to group k input activations whose value is 0 among the input activation data received from the memory 310, operations between the k input activations having the value 0 and the k weights respectively corresponding thereto may be skipped. Thus, by skipping such operations, the processor 320 of one or more embodiments may decrease an amount of operations used to process complex input data, thereby advantageously increasing a processing speed and/or reducing a used processing power of the processor 320 on which the operations may be implemented.

Accordingly, the processor 320 may group input activations whose value is 0 before processing the input activation data received from the memory 310 in the multiplier 321 and determine whether to skip the operations of the grouped input activations. Hereinafter, embodiments will be further described in detail with reference to FIGS. 4 to 13, as non-limiting examples.

Figure 4:
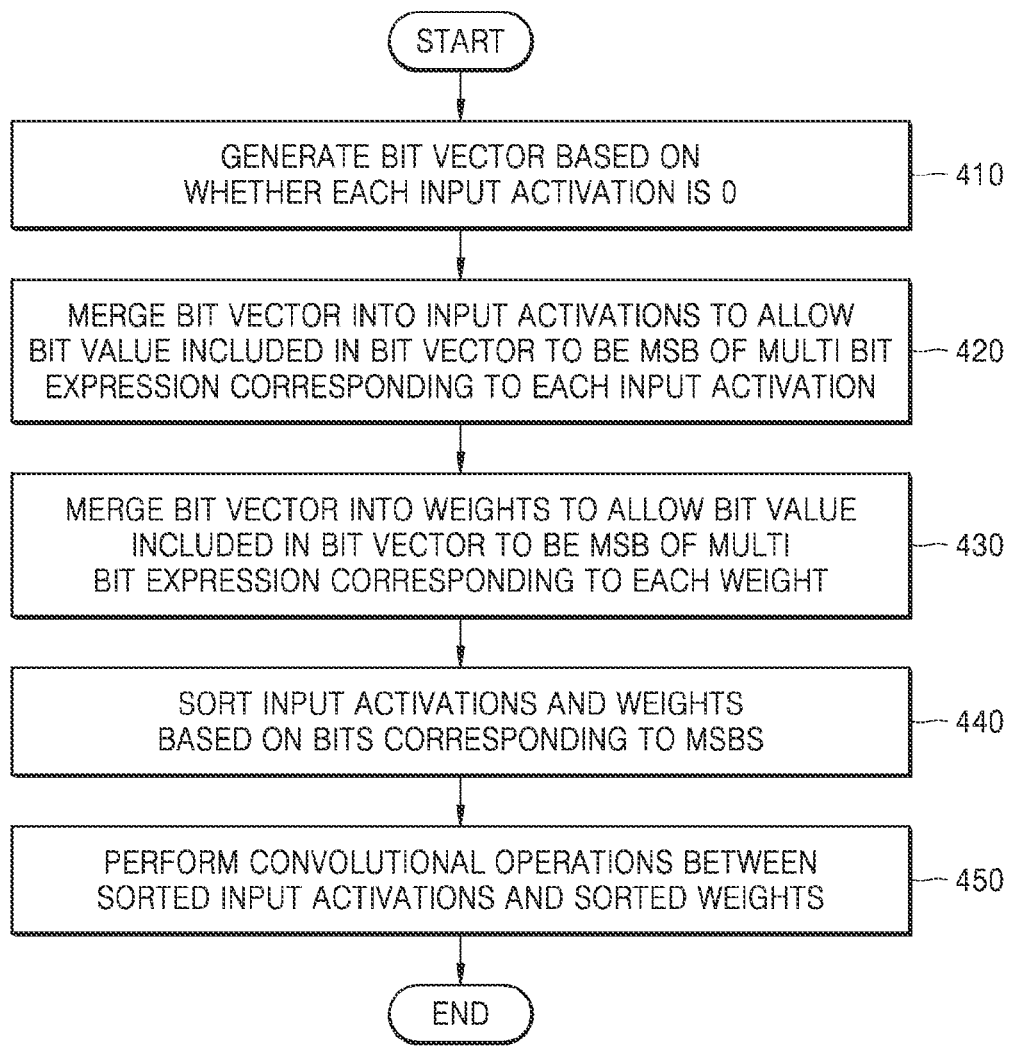
FIG. 4 illustrates a method of performing convolutional operations between input activations and weights in a neural network according to one or more embodiments.

FIG. 4 illustrates a method of performing convolutional operations between input activations and weights in a neural network according to one or more embodiments.

Referring to FIG. 4, in operation 410, the neural network device 300 may generate a bit vector based on whether each of the input activations is 0 or not. The generating of the bit vector will be further described with reference to FIG. 5, as a non-limiting example.

Figure 5:
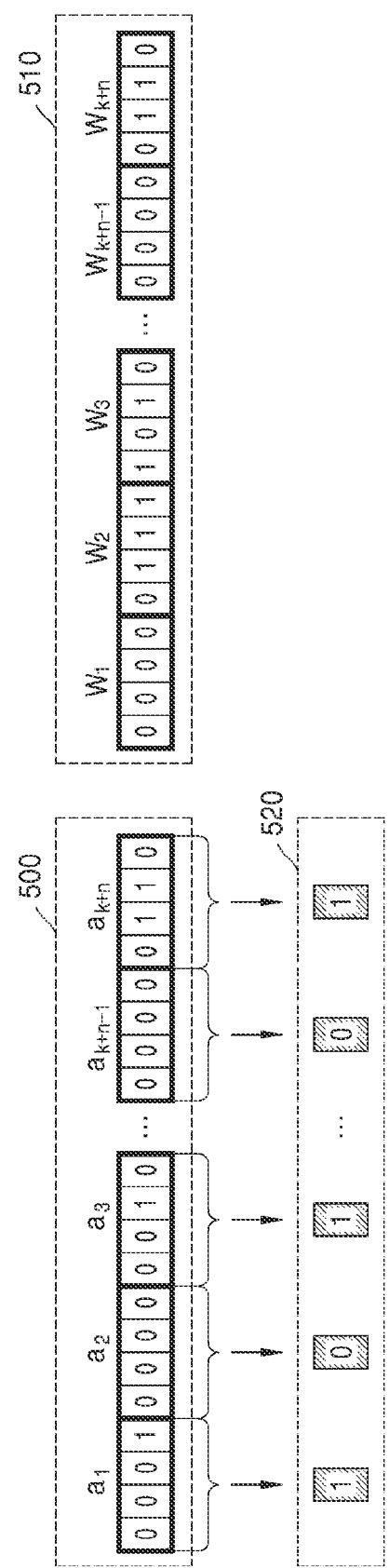
FIG. 5 illustrates generating a bit vector according to one or more embodiments.

FIG. 5 illustrates generating a bit vector according to one or more embodiments.

First, the processor 320 may obtain k+n input activations 500 and k+n weights 510 corresponding thereto from the memory 310.

The k+n input activations 500 may include input activations $a_1$ to $a_{k+n}$. Each of the input activations may be represented by multi bits. For example, each of the input activations may be represented by 4 bits, but is not limited thereto and may be represented by various numbers of bits. In a similar manner, the k+n weights 510 may include weights $w_1$ to $w_{k+n}$. Each of the weights may be represented by multi bits. For example, each of the weights may be represented by 4 bits, but is not limited thereto.

The processor 320 may generate a first bit value for an input activation whose value is not 0 among the k+n input activations 500, and generate a second bit value for an input activation whose value is 0 among the k+n input activations 500. The first bit value may be 1 and the second bit value may be 0, without being limited thereto. For example, when the input activation $a_1$ is not 0, the first bit value of 1 may be generated to correspond to the input activation $a_1$. When the input activation $a_2$ is 0, the second bit value of 0 may be generated to correspond to the input activation $a_2$. In such a manner, a bit vector 520 may be generated based on whether each of the k+n input activations 500 is 0. Thus, the bit vector 520 may include k+n bit values respectively corresponding to the k+n input activations 500.

Referring back to FIG. 4, in operation 420, the neural network device 300 may merge the bit vector 520 into the input activations 500 such that each of the bit values included in the bit vector 520 is to be a most significant bit (MSB) of the multi bit expression corresponding to each input activation. The merging of the bit vector 520 into the input activations will be further described with reference to FIG. 6, as a non-limiting example.

Figure 6:
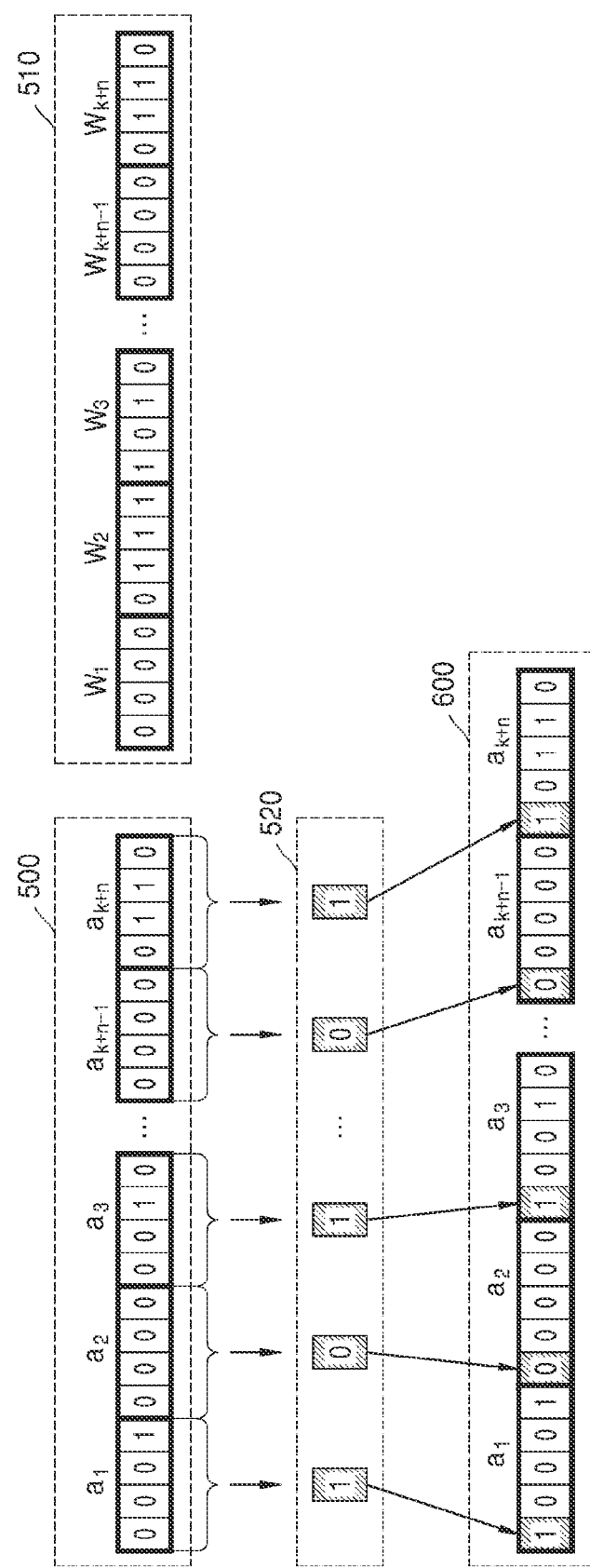
FIG. 6 illustrates adding a bit vector to the input activations according to one or more embodiments.

FIG. 6 illustrates merging a bit vector to input activations according to one or more embodiments.

Referring to FIG. 6, the processor 320 may merge each of the bit values of the bit vector 520 into each of the input activations corresponding thereto among the k+n input activations 500. For example, the first bit value of 1 generated for the input activation a1 may be merged into the input activation a1, and the second bit value of 0 generated for the input activation a2 may be merged into the input activation a2. In this regard, the first bit value of 1 added to the input activation a1 may be an MSB of the multi bit expression corresponding to the input activation a1, and the second bit value of 0 added to the input activation a2 may also be an MSB of the multi bit expression corresponding to the input activation $a_2$. Therefore, each of k+n input activations 600 generated by adding the bit vector 520 may be represented by 5 bits.

Referring back to FIG. 4, in operation 430, the neural network device 300 may merge the bit vector 520 into the weights such that each of the bit values included in the bit vector 520 is to be an MSB of a multi bit expression corresponding each weight. The merging of the bit vector 520 to the weights will be further described with reference to FIG. 7, as a non-limiting example.

Figure 7:
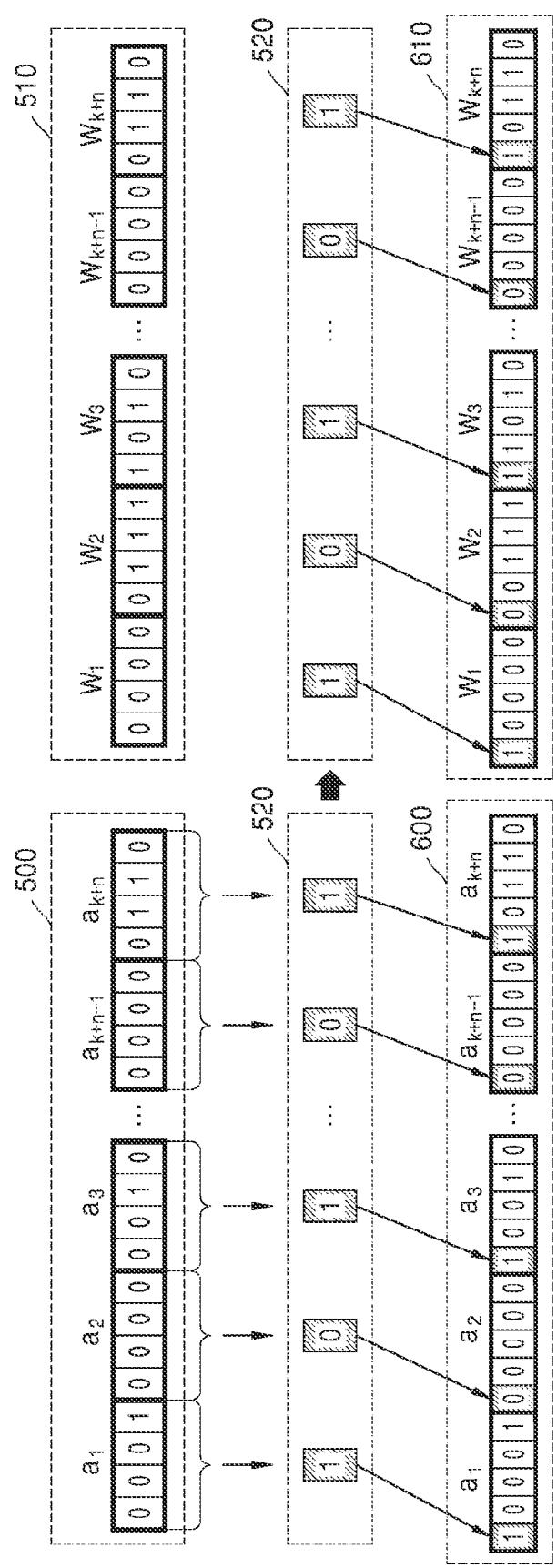
FIG. 7 illustrates adding a bit vector to weights according to one or more embodiments.

FIG. 7 illustrates merging a bit vector into weights according to one or more embodiments.

Referring to FIG. 7, the processor 320 may merge the bit vector 520 generated based on the k+n input activations 500 into the k+n weights 510. A bit value merged into the MSB of the multi bit expression corresponding to a first input activation among the input activations may be merged into the MSB of the multi bit expression corresponding to a first weight on which an operation is to be performed with the first input activation among the weights.

For example, the first bit value of 1 generated for the input activation a1 may be merged into the weight w1 on which an operation is to be performed with the input activation a1, and the second bit value of 0 generated for the input activation a2 may be merged into the weight w2 on which an operation is to be performed with the input activation a2. Here, the first bit value of 1 merged into the input activation a1 may be the MSB of the multi bit expression corresponding to the weight w1, and the second bit value of 0 merged into the input activation a2 may also be the MSB of the multi bit expression corresponding to the weight w2. Thus, each of k+n weights 610 generated by merging the bit vector 520 thereinto may be represented by 5 bits.

Referring back to FIG. 4, in operation 440, the neural network device 300 may sort the input activations and the weights based on bits corresponding to the MSBs. The sorting of the input activations and the weight will be further described with reference to FIG. 8, as a non-limiting example.

Figure 8:
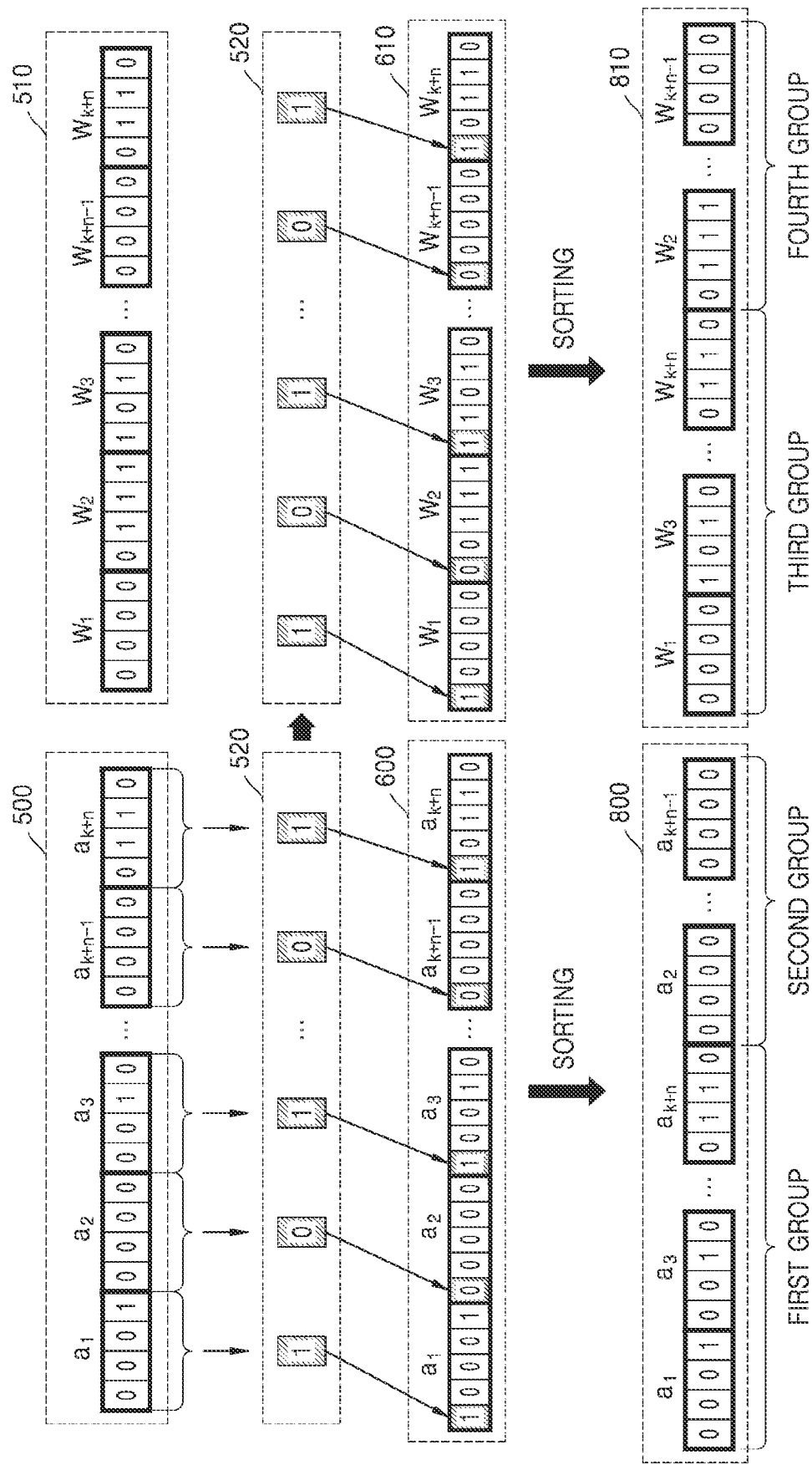
FIG. 8 illustrates sorting input activations and weights according to one or more embodiments.

FIG. 8 illustrates sorting input activations and weights according to one or more embodiments.

Referring to FIG. 8, the processor 320 may apply a sorting algorithm respectively to the k+n input activations 600 generated by merging the bit vector 520 thereinto and the k+n weights 610 generated by merging the bit vector 520 thereinto. In this case, the processor 320 may sort the k+n input activations 600 and the k+n weights 610 based on the bits corresponding to the MSBs.

For example, the processor 320 may sort the k+n input activations 600 generated by merging the bit vector 520 thereinto in the order of a first group including input activations in which the first bit value of 1 is merged into the MSB and a second group including input activation in which the second bit value of 0 is merged into the MSB.

In a similar manner, the processor 320 may sort the k+n weights 610 generated by merging the bit vector 520 thereinto in the order of a third group including weights in which the first bit value of 1 is merged into the MSB and a fourth group including weights in which the second bit value of 0 is merged into the MSB.

For example, the input activations including the first bit value of 1 merged into the MSB may include input activations $a_1$, $a_3$, and $a_{k+n}$ which constitute the first group.

In addition, the input activations including the second bit value of 0 merged into the MSB may include input activations $a_2$ and $a_{k+n-1}$ which constitute the second group.

In a similar manner, the weights including the first bit value of 1 merged into the MSB may include weights $w_1$, $w_3$ and $w_{k+n}$ which constitute the third group. In addition, the weights including the second bit value of 0 merged into the MSB may include weights $w_2$ and $w_{k+n-1}$ which constitute the fourth group.

As described above, a same bit vector may be merged into each of the input activations and the weights and a same sorting algorithm may be applied thereto. Thus, an nth input activation among sorted input activations 800 and an nth weight among sorted weights 810 may be a pair for an operation to be performed by the pointwise multiplication operation (where n is a natural number).

Meanwhile, the sorting algorithm may be a bubble sort algorithm, shell sort algorithm, bitonic sort algorithm, comb sort algorithm, cycle sort algorithm, or even-odd mergesort algorithm, without being limited thereto. The sorting algorithm may be the even-odd mergesort. The Merge Sort is a sorting method including splitting an array of numbers into individual numbers and merging the numbers. The even-odd mergesort algorithm may sort items via comparison of odd and even positions.

Referring back to FIG. 4, in operation 450, the neural network device 300 may perform operations between the sorted input activations and the sorted weights. The operations between the sorted input activations and the sorted weights will be further described with reference to FIG. 9, as a non-limiting example.

Figure 9:
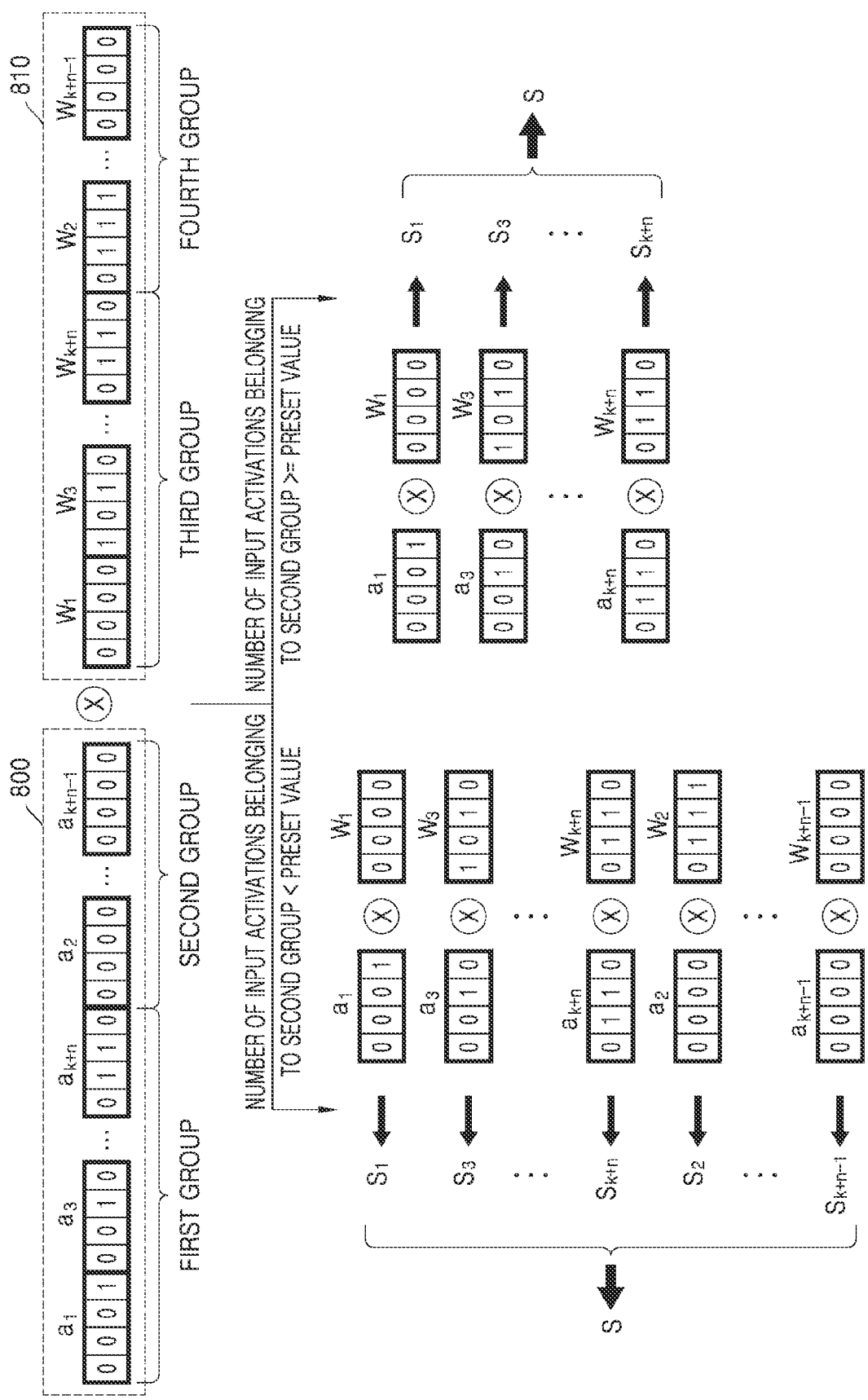
FIG. 9 illustrates performing operations between sorted input activations and sorted weights according to one or more embodiments.

FIG. 9 illustrates performing operations between sorted input activations and sorted weights according to one or more embodiments.

When the number of input activations belonging to the second group among the sorted input activations 800 is less than a preset value, the processor 320 may perform operations between an $n^{th}$ input activation among the sorted input activations 800 and an $n^{th}$ weight among the sorted weights 810, respectively (where n is a natural number). The preset value may correspond to a total number of input activations on which operations may simultaneously be performed (e.g., performed in parallel). For example, when pointwise multiplication operations between k input activations and k weights respectively corresponding to the input activations are able to be performed simultaneously in the multiplier 321, the preset value may be k.

Referring to FIG. 9, an operation result between the first input activation a1 among the sorted input activations 800 and the first weight w1 among the sorted weights 810 is 51. In a similar manner, an operation result between the second input activation a3 among the sorted input activations 800 and the second weight w3 among the sorted weights 810 is S3. The processor 320 may then sum up all operation results obtained from the operations between the sorted input activations 800 and the sorted weights 810 to obtain an operation result of S.

In FIG. 9, when each the operation results between the input activations belonging to the second group among the sorted input activations 800 and the weights belonging to the fourth group among the sorted weights 810 is 0, the operation results do not affect the operation result of S. However, when the number of input activations belonging to the second group is less than w (e.g., a row size), the operations between the input activations belonging to the second group and the weights belonging to the fourth group among the sorted weights 810 are performed and are not skipped.

When the number of input activations belonging to the second group among sorted input activations 800 is greater than or equal to the preset value, the processor 320 may perform operations between input activations belonging to the first group and weights belonging to the third group and skip (e.g., determine not to perform and/or not perform) one or more of the operations between the input activations belonging to the second group and the weights belonging to the fourth group.

For example, the processor 320 may skip operations between the number of input activations corresponding (or equal) to the preset value from among the input activations belonging to the second group and the number of weights corresponding (or equal) to the preset value from among the weights belonging to the fourth group. For example, the neural network device 300 may skip a number of operations corresponding to the preset value from among operations between the input activations belonging to the second group and the weights belonging to the fourth group.

Referring to FIG. 9, when the number of input activations belonging to the second group among the sorted input activations 800 is k, the operations between the input activations belonging to the second group and the weights belonging to the fourth group may be skipped. Therefore, all operation results between the input activations belonging to the first group and the weights belonging to the third group are summed up to obtain an operation result of S.

Also referring to FIG. 9, when the number of input activations belonging to the second group among the sorted input activations 800 is greater than k, operations between k input activations belonging to the second group and k weights belonging to the fourth group may be skipped.

Figure 10:
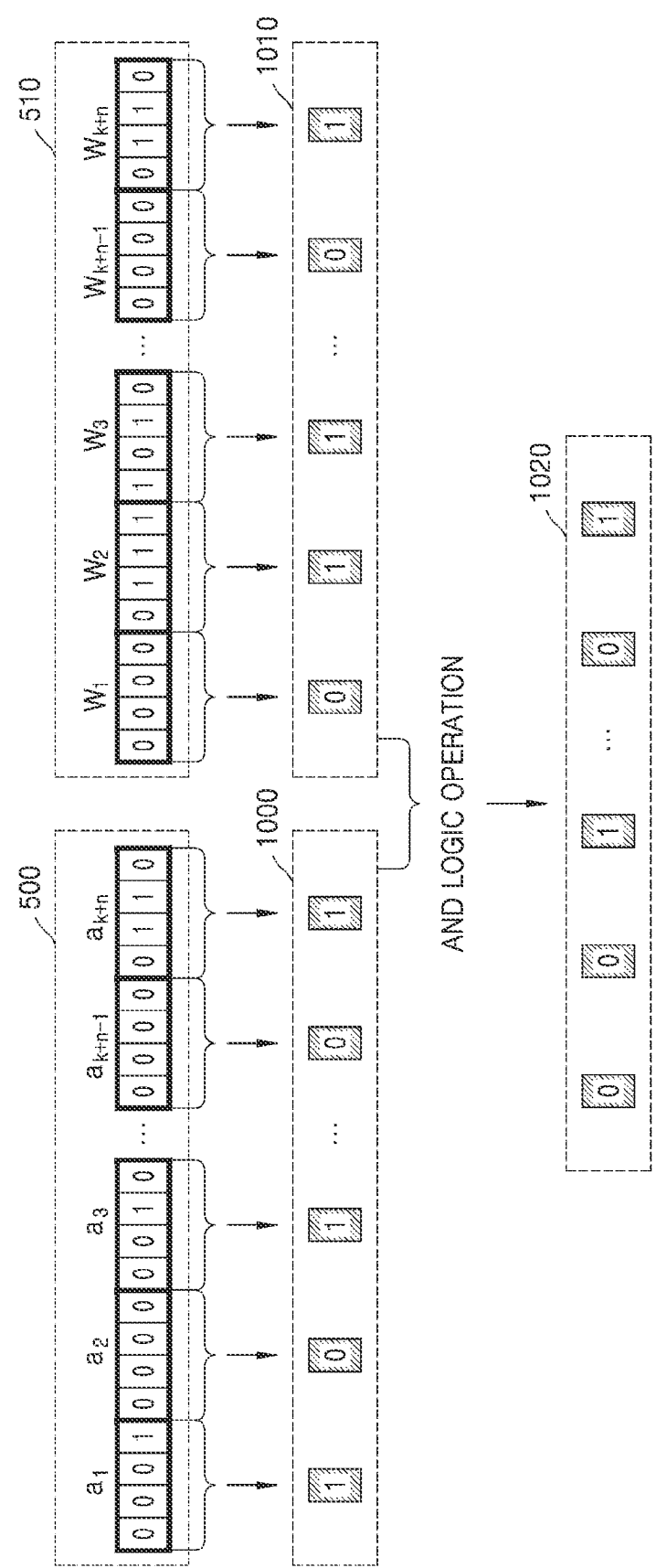
FIG. 10 illustrates generating a bit vector according to one or more embodiments.

FIG. 10 illustrates generating a bit vector according to one or more embodiments.

As described above with reference to FIGS. 4 to 9, the neural network device 300 may generate a bit vector based on whether each of the input activations is 0 and perform operations between sorted input activations and sorted weights based thereon. In this regard, when the number of input activations of which a value is 0 among the sorted input activations is less than a preset value, one or more of the operations between the input activations belonging to the second group and the weights belonging to the fourth group are not skipped.

As well as the input activations, when a weight is 0, a result of a multiplication operation between the input activation and the weight is 0, which does not affect a result. Thus, the bit vector may be generated based on whether at least one of the input activation and the weight is 0.

For example, as described above with reference to FIG. 5, the processor 320 may generate a first bit value for an input activation whose value is not 0 among the k+n input activations 500 and generate a second bit value for an input activation whose value is 0 among the k+n input activations 500. The first bit value may be 1 and the second bit value may be 0, without being limited thereto. For example, when the input activation a1 is not 0, the first bit value of 1 may be generated to correspond to the input activation a1. When the input activation a2 is 0, the second bit value of 0 may be generated to correspond to the input activation a2. In such a manner, a first vector 1000 may be generated based on whether each of the k+n input activations 500 is 0.

In a similar manner, as shown in FIG. 10, the processor 320 may generate the first bit value for a weight whose value is not 0 among the k+n weights and generate the second bit value for a weight whose value is 0 among the k+n weights 510. For example, when the weight w1 is 0, the second bit value of 0 may be generated to correspond to the weight w1. When the weight w2 is not 0, the first bit value of 1 may be generated to correspond to the weight w2. In such a manner, a second vector 1010 may be generated based on whether each of the k+n weights 510 is 0.

Then, the processor 320 may generate a bit vector 1020 by performing an AND logic operation between the first vector 1000 and the second vector 1010. Accordingly, in an example, a bit value of the bit vector 1020 (corresponding to an input activation and a weight) may be generated to be 0 when either one of the input activation and the weight has a value of zero, and may be generated to be 1 when both of the input activation and the weight has a value of zero.

The bit vector 1020 generated as described above may include more bit values corresponding to 0 than the bit vector generated based on whether each of the input activations is 0.

Figure 11:
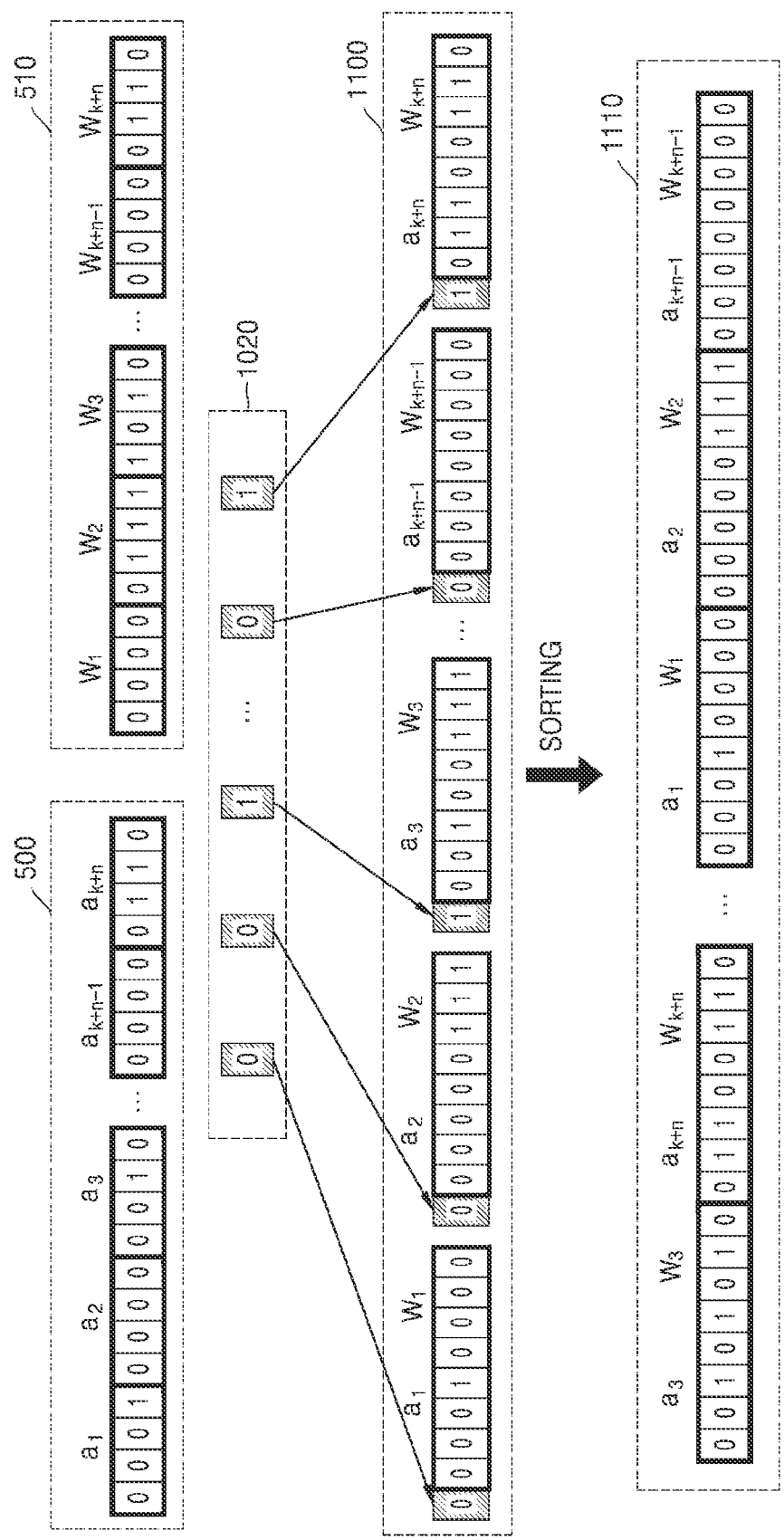
FIG. 11 illustrates sorting input activations and weights according to one or more embodiments.

FIG. 11 illustrates sorting input activations and weights according to one or more embodiments.

Referring to FIG. 11, an nth input activation among sorted input activations 500 and an nth weight among the sorted weights 510 may constitute one pair (where n is a natural number).

In this regard, the processor 320 may merge each of the bit values of the bit vector 1020 into a corresponding pair among the pairs of the k+n input activations 500 and the k+n weights 510. For example, the second bit value of 0 generated to correspond to the input activation a1 and the weight w1 may be merged into a pair of the input activation a1 and the weight w1. The second bit value of 0 merged into the pair of the input activation a1 and weight w1 may be an MSB of the multi bit expression corresponding to the pair. Therefore, each of k+n pairs 1100 generated by merging the bit vector 1020 thereto may be represented by 9 bits.

Then, the processor 320 may apply a sorting algorithm to each of the k+n pairs 1100 generated by merging the bit vector 1020 thereinto. The neural network device 300 may sort the k+n pairs 1100 generated by merging the bit vector 1020 thereinto based on the bits corresponding to the MSBs. For example, the neural network device 300 may sort the k+n pairs 1100 in the order of a first group including pairs in which the first bit value is merged into the MSB and a second group including pairs in which the second bit value is merged into the MSB.

When the number of pairs belonging to the second group among sorted pairs 1110 is less than a preset value, the neural network device 300 may perform operations between input activations and weights respectively included in the sorted k+n pairs 1110.

Alternatively, when the number of pairs belonging to the second group among the sorted pairs 1110 is greater than or equal to the preset value, the neural network device 300 may skip at least some of the operations between input activations and weights respectively included in the pairs belonging to the second group. For example, the neural network device 300 may skip operations between input activations and weights included in each of the number of pairs corresponding to the preset value from among the pairs belonging to the second group.

The present value may be a total number of input activations on which operations may simultaneously be performed.

Figure 12:
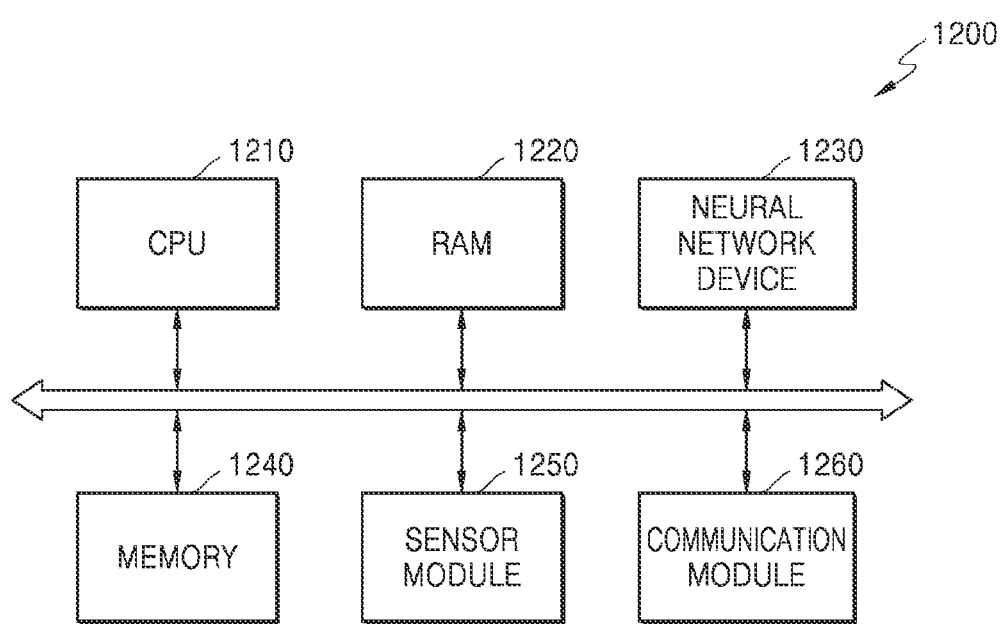
FIG. 12 illustrates an electronic system according to one or more embodiments.

FIG. 12 illustrates an electronic system according to one or more embodiments.

Referring to FIG. 12, an electronic system 1200 may extract effective information by analyzing input data in real time, based on a neural network, and may determine a situation or control elements of an electronic device on which the electronic system 1200 is mounted, based on the extracted information. For example, the electronic system 1200 may be applied to or mounted on robot devices such as drones and advanced drivers assistance systems (ADAS), smart TVs, smart phones, medical devices, mobile devices, image display devices, measuring devices, IoT devices, and any other various types of electronic devices. In another example, the electronic system 1200 includes the electronic device, or the electronic system 1200 is external to the electronic device.

The electronic system 1200 may include a CPU 1210, RAM 1220, a neural network device 1230, a memory 1240, a sensor module 1250, and a communication module 1260. The electronic system 1200 may further include an input/output module, a security module, a power control device, and the like. Some hardware components of the electronic system 1200 may be mounted on at least one semiconductor chip. The neural network device 1230 may be the above-described hardware accelerator dedicated for implementing or driving the neural network or a device including the same.

The CPU 1210 may control the overall operation of the electronic system 1200. The CPU 1210 may include one processor core (Single Core) or a plurality of processor cores (Multi-Core). The CPU 1210 may process or execute programs and/or data stored in the memory 1240. In an embodiment, the CPU 1210 may control functions of the neural network device 1230 by executing the programs stored in the memory 1240. The CPU 1210 may be implemented by a CPU, GPU, AP, or the like.

The RAM 1220 may temporarily store programs, data, or instructions. For example, the programs and/or data stored in the memory 1240 may be temporarily stored in the RAM 1220 according to the control of the CPU 1210 or booting code. The RAM 1220 may be implemented by memory such as dynamic RAM (DRAM) or static RAM (SRAM).

The neural network device 1230 may perform an operation of a neural network based on received input data and generate an information signal based on a result of the operation. The neural network may include convolutional neural networks (CNNs), recurrent neural networks (RNNs), deep belief networks, restricted Boltzmann machines, and the like, but is not limited thereto. The neural network device 1230 may correspond to the hardware accelerator dedicated for implementing or driving the neural network described above.

The information signal may include one of various types of recognition signals such as a speech recognition signal, an object recognition signal, an image recognition signal, and a biometric information recognition signal. For example, the neural network device 1230 may receive frame data included in a video stream as input data and generate, from the frame data, a recognition signal for an object included in an image indicated by the frame data. However, the present disclosure is not limited thereto, and the neural network device 1230 may receive various types of input data and generate a recognition signal according to the input data, according to type or function of an electronic device on which the electronic system 1200 is mounted.

The memory 1240 is a storage for storing data, such as an operating system (OS), various programs, and various pieces of data. In an embodiment, the memory 1240 may store intermediate results generated in an operation performing process of the neural network device 1230, such as an output feature map, as an output feature list or an output feature matrix. In an embodiment, the memory 1240 may store a compressed output feature map. In addition, the memory 1240 may store quantized neural network data, such as, parameters, weight maps, or weight lists which are used by the neural network device 1230.

The memory 1240 may be DRAM, but is not limited thereto. The memory 1240 may include at least one of a volatile memory and a nonvolatile memory. The nonvolatile memory may include ROM, PROM, EPROM, EEPROM, flash memory, PRAM, MRAM, RRAM, FRAM, and the like. The volatile memory may include DRAM, SRAM, SDRAM, PRAM, MRAM, RRAM, FeRAM, and the like. In one or more embodiments, the memory 1240 may include at least one of HDD, SSD, CF, SD, Micro-SD, Mini-SD, xD, or Memory Stick.

The sensor module 1250 may collect information about periphery of the electronic device on which the electronic system 1200 is mounted. The sensor module 1250 may sense or receive a signal (such as an image signal, a speech signal, a magnetic signal, a biometric signal, and a touch signal) from the outside of the electronic device, and convert a sensed or received signal to data. To this end, the sensor module 1250 may include at least one of various types of sensing devices, such as microphones, imaging devices, image sensors, light detection and ranging (LIDAR) sensors, ultrasonic sensors, infrared sensors, biosensors, or touch sensors.

The sensor module 1250 may provide the neural network device 1230 with the converted data as input data. For example, the sensor module 1250 may include an image sensor, and may generate a video stream by photographing the external environment of the electronic device and provide the neural network device 1230 with consecutive data frames of the video stream in the order of input data. However, the present disclosure is not limited thereto, and the sensor module 1250 may provide various types of data to the neural network device 1230.

The communication module 1260 may include various wired or wireless interfaces capable of communicating with external devices. For example, the communication module 1260 may include local area network (LAN), wireless local area network (WLAN) such as wireless fidelity (Wi-Fi), wireless personal area network (WPAN) such as Bluetooth, wireless universal serial bus (USB), Zigbee, near field communication (NFC), radio-frequency identification (RFID), power line communication (PLC), or a communication interface capable of connecting to a mobile cellular network such as $3^{rd}$ generation (3G), $4^{th}$ generation (4G), long-term evolution (LTE), and $5^{th}$ generation (5G).

Hereinafter, the neural network device 1230 will be further described in more detail with reference to FIG. 13, as a non-limiting example.

Figure 13:
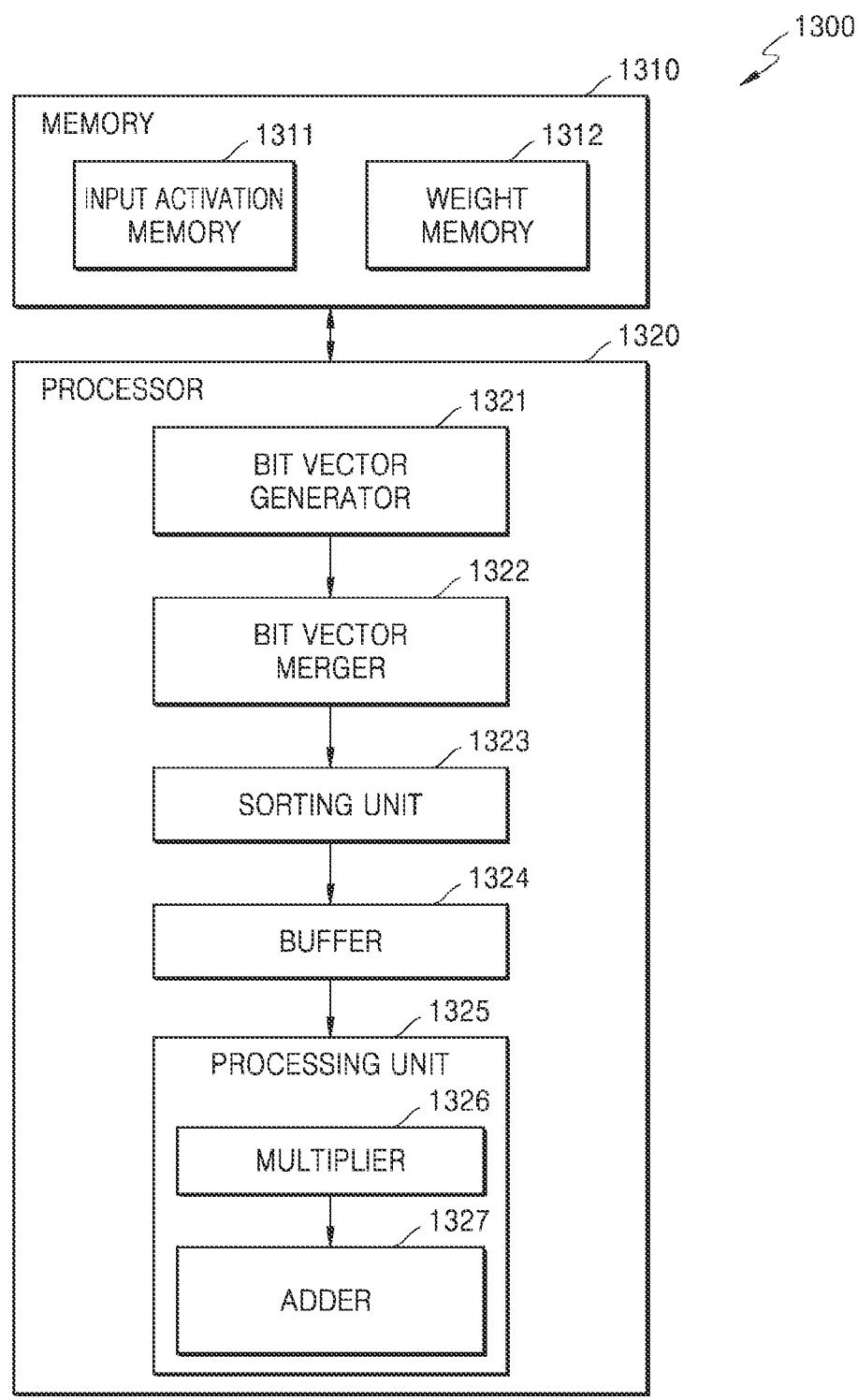
FIG. 13 illustrates a configuration of a neural network device according to one or more embodiments.

FIG. 13 illustrates a neural network device according to one or more embodiments.

Referring to FIG. 13, a neural network device 1300 according to an embodiment includes a memory 1310 (including an input activation memory 1311 and a weight memory 1312) and a processor 1320.

The neural network device 1300 illustrated in FIG. 13 includes elements used to perform the method of convolutional operations between input activations and weights in the neural network described above with reference to FIGS. 4 to 12. Thus, descriptions given above with reference to FIGS. 4 to 12 may also be applied to the neural network device 1300 illustrated in FIG. 13.

Because the neural network device 1300 of FIG. 13 may be similar or identical to the neural network device 300 of FIG. 3, descriptions for the neural network device 300 of FIG. 3 may also be applied to those of FIG. 13.

In addition, because the memory 1310 of FIG. 13 may be similar or identical to the memory 310 of FIG. 3, descriptions for the memory 310 of FIG. 3 may also be applied to those of FIG. 13.

The processor 1320 of FIG. 13 may include a bit vector generator 1321, a bit vector merger 1322, a sorting unit 1323, a buffer 1324, and a processing unit 1325. In addition, the processing unit 1325 may include a multiplier 1326 and an adder 1327.

The bit vector generator 1321 may generate a bit vector based on whether each of the input activations is 0. For example, the bit vector generator 1321 may generate the first bit value for an input activation whose value is not 0 among the input activations and generate the second bit value for an input activation whose value is 0 among the input activations.

The bit vector merger 1322 may merge the bit vector into the input activations such that each of the bit values included in the bit vector is to be an MSB of the multi bit expression corresponding to each input activation. In addition, the bit vector merger 1322 may merge the bit vector into the weights such that each of the bit values included in the bit vector is to be an MSB of the multi bit expression corresponding to each weight. For example, a bit value merged into the MSB of the multi bit expression corresponding to the first input activation among the input activations may be merged into the MSB of the multi bit expression corresponding to the first weight on which an operation is to be performed with the first input activation among the weights.

The sorting unit 1323 may sort input activations and weights based on the bits corresponding to the MSBs. For example, the sorting unit 1323 may sort the input activations in the order of a first group including input activations in which the first bit value is merged into the MSB and a second group including input activations in which the second bit value is merged into the MSB. In addition, the sorting unit 1323 may sort the weights in the order of a third group including weights in which the first bit value is merged into the MSB and a fourth group including weights in which the second bit value is merged into the MSB.

The buffer 1324 may store k+n input activations and k+n weights obtained from the memory 1310. The buffer 1324 may be included in the processor 1320 for a pipeline.

The processing unit 1325 may perform operations between the sorted input activations and the sorted weights. For example, when the number of input activations belonging to the second group is less than a preset value, the processing unit 1325 may perform operations between an $n^{th}$ input activation among the sorted input activations (n is a natural number) and an $n^{th}$ weight among the sorted weights, respectively.

In addition, when the number of input activations belonging to the second group is the preset value or greater, the processing unit 1325 may perform the operations between the input activations belonging to the first group and the weights belonging to the third group and skip at least some of the operations between the input activations belonging to the second group and the weights belonging to the fourth group. In this regard, the preset value corresponds to the total number of input activations on which operations may simultaneously be performed, and operations between the number of input activations corresponding to the preset value from among the input activations belonging to the second group and the number of weights corresponding to the preset value from among the weights belonging to the fourth groups may be skipped.

Because the multiplier 1326 and the adder 1327 of FIG. 13 may be similar or identical to the multiplier 321 and the adder 322 of FIG. 3 respectively, descriptions of the multiplier 321 and the adder 322 of FIG. 3 may also be applied to those of FIG. 13.

The neural network devices, memories, input activation memories, weight memories, processors, multipliers, adders, electronic systems, CPUs, RAMs, sensor modules, communication modules, bit vector generators, bit vector mergers, sorting units, buffers, processing units, neural network device 300, memory 310, input activation memory 311, weight memory 312, processor 320, multiplier 321, adder 322, electronic system 1200, CPU 1210, RAM 1220, neural network device 1230, memory 1240, sensor module 1250, communication module 1260, neural network device 1300, memory 1310, input activation memory 1311, weight memory 1312, processor 1320, bit vector generator 1321, bit vector merger 1322, sorting unit 1323, buffer 1324, processing unit 1325, multiplier 1326, adder 1327, and other apparatuses, units, modules, devices, and other components described herein with respect to FIGS. 1-13 are implemented by or representative of hardware components. Examples of hardware components that may be used to perform the operations described in this application where appropriate include controllers, sensors, generators, drivers, memories, comparators, arithmetic logic modules, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic module, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network method, the method comprising:
    generating a bit vector based on whether each of a plurality of input activations within a neural network is 0;
    generating a merged multi bit expression for a respective input activation by merging bit values included in the bit vector into most significant bits (MSBs) of multi bit expressions of the input activations;
    generating a merged multi bit expression for a respective weight by merging the bit values included in the bit vector into most significant bits (MSBs) of multi bit expressions of weights within the neural network;
    applying a same sorting algorithm respectively to the merged multi bit expressions of the input activations and the weights to sort the input activations and the weights based on bits corresponding to the MSBs; and
    performing neural network operations between the sorted input activations and the sorted weights.

2. The method of claim 1, wherein the generating of the bit vector comprises:
    generating a first bit value of the bit values in response to an input activation among the input activations not being 0; and
    generating a second bit value of the bit values in response to another input activation among the input activations being 0.

3. The method of claim 2, wherein the merged multi bit expression for the respective input activation is generated by merging the first bit value into an MSB of the input activation and by merging the second bit value into an MSB of the other input activation.

4. The method of claim 2, wherein the applying of the same sorting algorithm comprises:
    sorting the input activations in an order of a first group including input activations in which the first bit value is merged into the MSB and a second group including input activations in which the second bit value is merged into the MSB; and
    sorting the weights in an order of a third group including weights in which the first bit value is merged into the MSB and a fourth group including weights in which the second bit value is merged into the MSB.

5. The method of claim 4, wherein, in response to a total number of input activations belonging to the second group being less than a preset value, the performing of the neural network operations comprises respectively performing neural network operations between an nth input activation among the sorted input activations and an nth input weight among the sorted weights, and wherein n is a natural number.

6. The method of claim 4, wherein, in response to a total number of input activations belonging to the second group being greater than or equal to a preset value, the performing of the neural network operations comprises:

performing neural network operations between the input activations belonging to the first group and the weights belonging to the third group; and skipping one or more operations between the input activations belonging to the second group and the weights belonging to the fourth group.

7. The method of claim 6, wherein the preset value is a total number of input activations on which operations are configured to be performed simultaneously by a processor, and wherein the skipping of the one or more operations comprises skipping operations between a number of input activations corresponding to the preset value from among the input activations belonging to the second group and a number of weights corresponding to the preset value from among the weights belonging to the fourth group.

8. The method of claim 1, wherein the generating of the bit vector comprises:

generating a first vector by:
generating a first bit value of the first vector in response to an input activation among the input activations not being 0, and
generating a second bit value of the first vector in response to another input activation among the input activations being 0;

generating a second vector by:
generating a first bit value of the second vector in response to a weight among the weights not being 0, and
generating a second bit value of the second vector in response to another weight among the weights being 0; and generating the bit vector by performing an AND logic operation between the first vector and the second vector.

9. The method of claim 1, wherein the merged multi bit expression for the respective weight is generated by merging a bit value, which is merged into an MSB of a multi bit expression of an input activation among the input activations, into an MSB of a multi bit expression of a weight among the weights on which an operation is to be performed with the input activation.

10. A non-transitory computer-readable storage medium storing instructions that, when executed by a processor, configure the processor to perform the method of claim 1.

11. An apparatus, the apparatus comprising:
a processor configured to:
generate a bit vector based on whether each of a plurality of input activations within a neural network is 0;
generate a merged multi bit expression for a respective input activation by merging bit values included in the bit vector into most significant bits (MSBs) of multi bit expressions of the input activations;
generate a merged multi bit expression for a respective weight by merging the bit values included in the bit vector into most significant bits (MSBs) of multi bit expressions of weights within the neural network;
apply a same sorting algorithm respectively to the merged multi bit expressions of the input activations and the weights to sort the input activations and the weights based on bits corresponding to the MSBs; and
perform neural network operations between the sorted input activations and the sorted weights.

12. The apparatus of claim 11, wherein, for the generating of the bit vector, the processor is configured to:
generate a first bit value of the bit values in response to an input activation among the input activations not being 0; and
generate a second bit value of the bit values in response to another input activation among the input activations being 0.

13. The apparatus of claim 12, wherein, for the applying of the same sorting algorithm, the processor is configured to:
sort the input activations in an order of a first group including input activations in which the first bit value is merged into the MSB and a second group including input activations in which the second bit value is merged into the MSB; and
sort the weights in an order of a third group including weights in which the first bit value is merged into the MSB and a fourth group including weights in which the second bit value is merged into the MSB.

14. The apparatus of claim 13, wherein, in response to a total number of input activations belonging to the second group being less than a preset value, the processor is configured to perform neural network operations between an nth input activation among the sorted input activations and an nth input weight among the sorted weights, and
wherein n is a natural number.

15. The apparatus of claim 13, wherein, for the performing of the neural network operations, in response to a total number of input activations belonging to the second group being greater than or equal to a preset value, the processor is configured to:
perform neural network operations between the input activations belonging to the first group and the weights belonging to the third group; and
skip one or more operations between the input activations belonging to the second group and the weights belonging to the fourth group.

16. The apparatus of claim 15, wherein the preset value is a total number of input activations on which operations are configure to be performed simultaneously by the processor, and
wherein for the skipping of the one or more operations, the processor is configured to skip operations between a number of input activations corresponding to the preset value from among the input activations belonging to the second group and a number of weights corresponding to the preset value from among the weights belonging to the fourth group.

17. The apparatus of claim 11, wherein, for the generating of the bit vector, the processor is configured to:
generate a first vector by:
generating a first bit value of the first vector in response to an input activation among the input activations not being 0, and
generating a second bit value of the first vector in response to another input activation among the input activations being 0, generate a second vector by:
- generating a first bit value of the second vector in response to a weight among the weights not being 0, and
- generating a second bit value of the second vector in response to another weight among the weights being 0, and
- generate the bit vector by performing an AND logic operation between the first vector and the second vector.

18. The apparatus of claim 11, wherein, for the generating of the merged multi bit expression for the respective weight, the processor is configured to merge a bit value, which is merged into an MSB of a multi bit expression of an input activation among the input activations, into an MSB of a multi bit expression of a weight among the weights on which an operation is to be performed with the input activation.

19. The apparatus of claim 11, wherein, for the applying of the same sorting algorithm, the processor is configured to sort the input activations and the weights according to any one of a bubble sort algorithm, a shell sort algorithm, a bitonic sort algorithm, a comb sort algorithm, a cycle sort algorithm, and an even-odd mergesort algorithm.

* * * * *